US011513953B2

(12) United States Patent
Danilov et al.

(10) Patent No.: US 11,513,953 B2
(45) Date of Patent: Nov. 29, 2022

(54) SYNCHRONIZING GARBAGE COLLECTION AND INCOMING DATA TRAFFIC

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 149 days.

(21) Appl. No.: 17/014,027

(22) Filed: Sep. 8, 2020

(65) Prior Publication Data

US 2022/0075719 A1    Mar. 10, 2022

(51) Int. Cl.
*G06F 12/02* (2006.01)
*G06F 12/123* (2016.01)
*G06F 16/17* (2019.01)
*G06F 16/11* (2019.01)
*G06F 16/16* (2019.01)

(52) U.S. Cl.
CPC ........ *G06F 12/0253* (2013.01); *G06F 12/123* (2013.01); *G06F 16/128* (2019.01); *G06F 16/162* (2019.01); *G06F 16/1734* (2019.01)

(58) Field of Classification Search
CPC .. G06F 16/128; G06F 16/1734; G06F 16/162; G06F 12/123; G06F 12/0253
See application file for complete search history.

(56) References Cited

U.S. PATENT DOCUMENTS

| | | | | |
|---|---|---|---|---|
| 9,176,871 | B1 * | 11/2015 | Serlet | G06F 12/122 |
| 9,830,345 | B1 * | 11/2017 | Baars | G06F 16/2246 |
| 10,346,299 | B1 * | 7/2019 | Danilov | G06F 16/27 |
| 2016/0170987 | A1 * | 6/2016 | Kesselman | G06F 16/2379 |
| | | | | 707/747 |

* cited by examiner

*Primary Examiner* — Edward J Dudek, Jr.
(74) *Attorney, Agent, or Firm* — Amin, Turocy & Watson, LLP

(57) ABSTRACT

The technology describes performing garbage collection while data writes are occurring, which can lead to a conflict in that a new reference to an otherwise non-referenced candidate object for garbage collection is written after the non-referenced candidate object is detected. In one example implementation, orphaned binary large objects (BLOBs) that are not referenced by a descriptor file and are beyond a certain age are detected and deleted via an object references table traversal as part of garbage collection. Before reclaiming a deleted BLOB's capacity, a background process operates to restore the deleted BLOB if a new descriptor file reference to the BLOB was written during the object references table traversal. Capacity is only reclaimed after the object references table traversal and the background processing completes, for those BLOBs that were deleted and had not been restored.

20 Claims, 11 Drawing Sheets

SYNCHRONIZING GARBAGE COLLECTION AND INCOMING DATA TRAFFIC

TECHNICAL FIELD

The subject application generally relates to data storage, and, for example, to a data storage system that facilitates performing garbage collection without data loss and without the need to halt the incoming data traffic, and related embodiments.

BACKGROUND

Contemporary cloud-based data storage systems, such as ECS (formerly known as ELASTIC CLOUD STORAGE) provided by DELL EMC, support data systems that are based on content addressable storage, such as CENTERA. In CENTERA, a data object received from an application is stored as a BLOB (Binary Large Object) and stored at a content address calculated based on the object's content. The address and object metadata are inserted into an XML file referred to as a C-Clip descriptor file (CDF), which in turn has its content address calculated. This C-Clip's address is returned to the application once the CDF and BLOB have been successfully stored and protected in the storage. From the ECS point of view, BLOBs and CDFs are fully independent objects. There is a thin CAS implementation layer that connects BLOBs and CDFs in order to serve data writes and reads BLOB deletion works at the CDF level, and when a BLOB no longer has any CDF references to it, then that BLOB is referred to as an orphaned BLOB. Such a BLOB object can be deleted and a garbage collection engine in ECS can reclaim the capacity the BLOB occupied. It is possible to have a BLOB become an orphan, yet become referenced by a CDF again as a result of a new CDF write. Note that ECS supports geographically distributed setups of two or more zones, where each zone is normally an ECS cluster; this makes the scenario of an orphaned BLOB again becoming referenced by a CDF even more probable.

In order to prevent a possible data loss event, when a CDF references a non-existent BLOB, each BLOB referenced by a new CDF has to be updated with a new reference to it in a foreground operation of the CDF write transaction. This prevents deletion of the BLOBs; that is, the references need to be added before client acknowledgement for the new CDF is sent. This serves as a kind of write barrier that severely impacts storage performance. Consider an example in which there are two ECS zone, in which a new CDF (which references one the order of 100,000 BLOBs) is written in the first zone write, with these BLOBs owned by the second (remote) zone. From the client perspective, creation of such a CDF, which is only of 10-20 MB size, will take an extremely long time because the client will not get an acknowledgement until the first zone updates system metadata of the 100,000 remotely owned BLOBs. One solution is to prevent incoming data traffic in a "stop-the-world" disruptive mode in which there is no need for synchronization with garbage collection that deletes orphaned BLOBS because there is no incoming data traffic; however this is a very undesirable solution.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
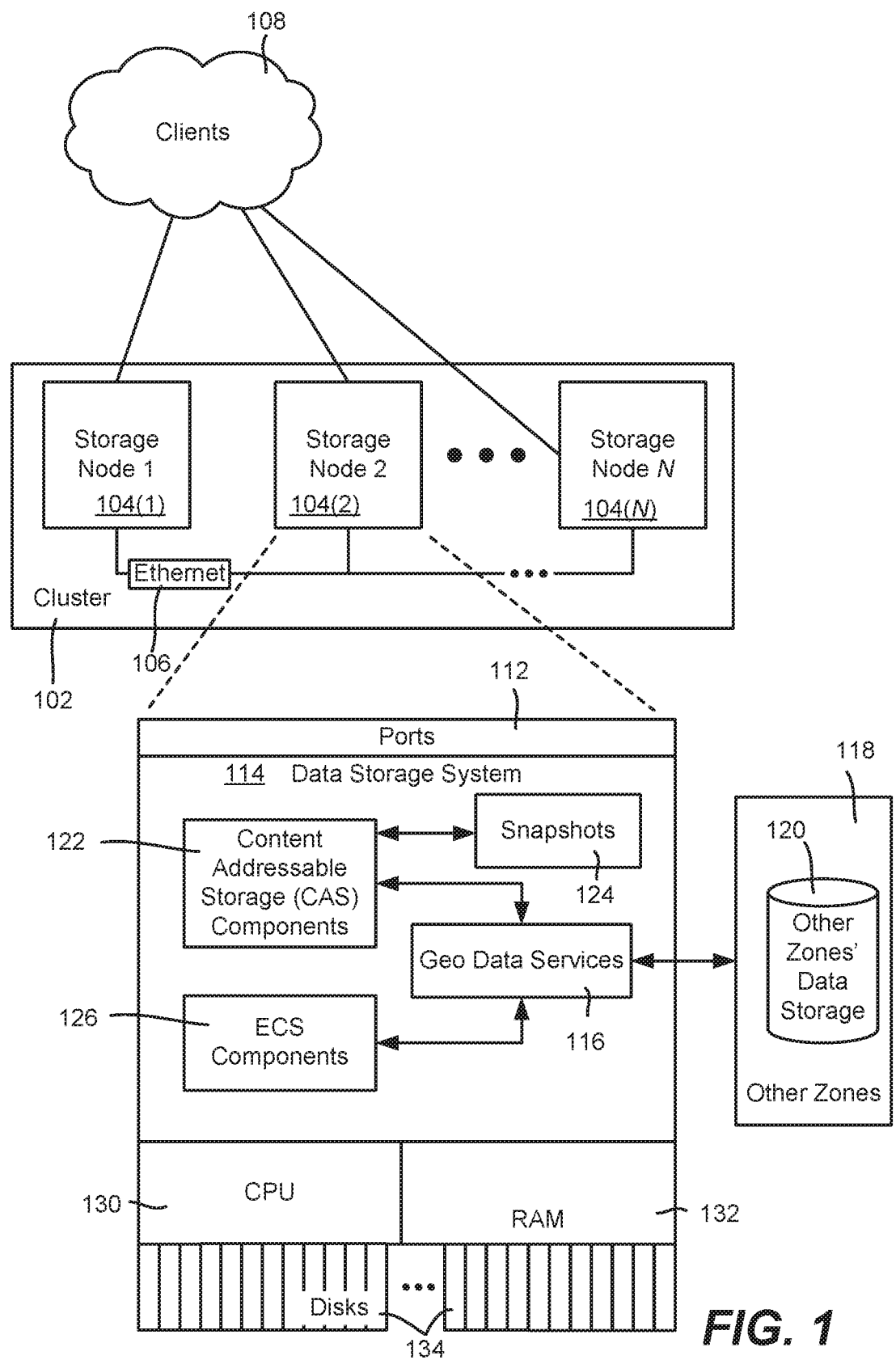
FIG. 1 is an example block diagram representation of part of a data storage system including nodes, in which garbage collection and data writes can occur without data loss via snapshot restoration, in accordance with various aspects and implementations of the subject disclosure.

Various aspects of the technology described herein are generally directed towards synchronize garbage collection and incoming data traffic in a manner that avoids a data loss event yet without the need to halt incoming data traffic from a mutator (e.g. application program). In one aspect, snapshots are used to eliminate write barriers, where a snapshot comprises an available, near instantaneous back-up copy of data created at a particular point in time. Note that in ECS, snapshots can be considered at the "bucket" level or simply bucket snapshots with respect to buckets with content addressable storage (CAS) access enabled.

In general and as described herein, a CAS garbage collection process traverses an object reference table (a search tree) to identify binary large objects (BLOBs) that are orphans, and deletes them; note however that such deletion does not reclaim their capacity. During the object references table traversal/CAS garbage collection operations, it is possible that a new C-Clip Descriptor File (CDF) is written (in a foreground process) that references a deleted orphan BLOB. If so, (in a background process), the BLOB is restored from an appropriate snapshot.

After the object references table traversal is finished, and when the background process completes for any CDF written during the object references table traversal, the snapshots are deleted by the CAS garbage collection process. Further an ECS garbage collection engine (a native garbage collection process implemented in an ECS Engine) operates to reclaim capacity of the deleted BLOBs that have not been restored.

The technology described herein, in which possible conflicts are detected in the background mode and resolved by means of snapshots, thus solves the problem of synchronization between garbage collection and incoming data traffic in a cloud storage. Indeed, from one perspective the technology can be considered as eliminating the need to do any synchronization, with only a relatively short delay in actual capacity reclamation for deleted orphan BLOBs.

As will be understood, the implementation(s) described herein are non-limiting examples, and variations to the technology can be implemented. For example, in ECS cloud storage technology the object references table is stored in a search tree data structure (a directory table), however any data storage or other system that needs to perform garbage collection without halting incoming data traffic may benefit from the present technology. Indeed, it should be understood that any of the examples herein are non-limiting. For instance, some of the examples are based on ECS cloud storage technology; however virtually any storage system may benefit from the technology described herein. Further, many of the examples refer to CAS binary large objects and CDF files, however attentive data storage systems with other data and metadata structures may be used with the technology described herein. Still further, snapshots are described as a convenient way to temporarily preserve data for restoring if needed, however any technology that preserves data can be used. Thus, any of the embodiments, aspects, concepts, structures, functionalities or examples described herein are non-limiting, and the technology may be used in various ways that provide benefits and advantages in computing and data storage in general.

FIG. 1 shows part of a cloud data storage system such as ECS comprising a zone (e.g., cluster) 102 of storage nodes 104(1)-104(N), in which each node is typically a server configured primarily to serve objects in response to client requests. The nodes 104(1)-104(N) are coupled to each other via a suitable data communications link comprising interfaces and protocols, such as represented in FIG. 1 by Ethernet block 106.

Clients 108 make data system-related requests to the cluster 102, which in general is configured as one large object namespace; there may be on the order of billions of objects maintained in a cluster, for example. To this end, a node such as the node 104(2) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

In general, and in one or more implementations, e.g., ECS, disk space is partitioned into a set of relatively large blocks of typically fixed size (e.g., 128 MB) referred to as chunks; user data is generally stored in chunks, e.g., in a user data repository. Normally, one chunk contains segments of several user objects. In other words, chunks can be shared, that is, one chunk may contain segments of multiple user objects; e.g., one chunk may contain mixed segments of some number of (e.g., three) user objects. Tree data can also be maintained in tree chunks.

In FIG. 1, each node, such as the node 104(2), includes an instance of a data storage system 114 and data services, including geographic (geo) data services 116 that facilitate coupling to other geographic zones 118, such as for replicating data to the other zones' data storage 120. Note however that at least some data service components can be per-cluster, or per group of nodes, rather than per-node.

ECS runs a set of storage services, which together implement storage business logic. Services can also maintain directory tables for keeping their metadata, which can be implemented as search trees; the data of search trees can be kept in tree chunk data structures. For example, an object table (one type of directory table) keeps track of objects in the data storage system and generally stores the system objects' metadata, including an object's data location within a chunk data structure. Note that the object table can be partitioned among the nodes 104(1)-104(N) of the cluster. There is also a "reverse" directory table (maintained by another service) that keeps a per chunk list of objects that have their data in a particular chunk.

In the example of FIG. 1, each node, such as the node 104(2), can include content addressable storage (CAS) components 122, including binary large objects (BLOBs) and descriptor files (C-Clip descriptor files, or CDFs). The CAS components also include a garbage collection process that works at the distributed storage level; in one or more implementations, the CAS garbage collection process creates snapshots 124 for the CAS-enabled buckets as described herein with reference to FIG. 2.

As set forth above, from the ECS point of view, such as represented in FIG. 1 by ESC components 126, BLOBs and CDFs are fully independent objects, and there is a CAS implementation layer that connects BLOBs and CDFs in order to serve data writes and reads. The ESC components 126 also include a garbage collection engine, as described herein with reference to FIG. 2, that reclaims capacity of deleted, orphaned BLOBs In FIG. 1, a CPU 130 and RAM 132 are shown; note that the RAM 132 may comprise at least some non-volatile RAM. The node includes storage devices such as disks 134, comprising hard disk drives and/or solid-state drives. As is understood, any node data structure such as an object, object table, chunk table, chunk, code, and the like can be in RAM 128, on disk(s) 130 or a combination of partially in RAM, partially on disk, backed on disk, replicated to other nodes and so on.

Figure 2:
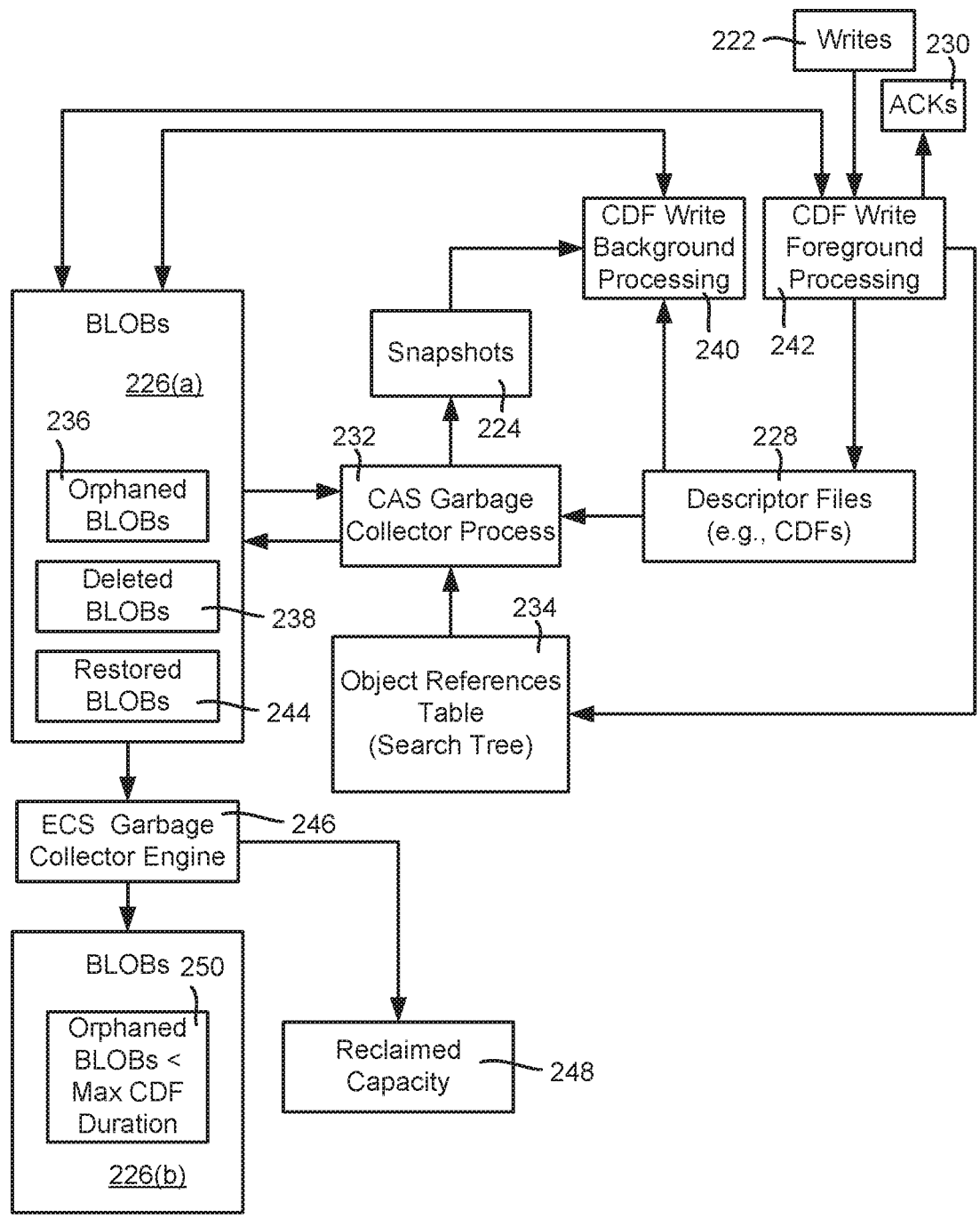
FIG. 2 is an example block diagram representation of part of a data storage system that performs garbage collection while new data writes are allowed to take place, with deleted object data restored from snapshot data in the event a new data write references a deleted object, in accordance with various aspects and implementations of the subject disclosure.

FIG. 2 shows example components including data that facilitate aspects of the technology described herein. In FIG. 2, data writes 222 result in CAS BLOB data 226(*a*) being created and deleted, along with descriptor files that reference the BLOBs. In general, a client application/program or the like delivers a data object, from which the content address (CA) is calculated and stored along with metadata about the object into a C-Clip Descriptor File (CDF) in CDF data storage 228. One CDF can reference up to 100,000 BLOBs, and one BLOB can be referenced by millions of CDFs. The BLOB(s) are stored in the storage before the referencing CDF, e.g., in a transaction, which if successful results in an acknowledgment (ACK) 230 being returned to the writer/client application.

BLOB deletion operates at the CDF level, and once the CDF references to a BLOB have been deleted, the data objects (BLOBs) become orphans. The capacity occupied by the orphans needs to be reclaimed via garbage collection. However, detecting orphans in a reliable way is not straightforward, because BLOBs can gain and lose references to them asynchronously, and because of the cluster environment, references to a BLOB can be handled independently on different cluster nodes.

In FIG. 2, when orphans are to be detected and deleted as described herein, a CAS garbage collection process 232 creates instant snapshots 224 for any buckets having CAS access enabled. Once the snapshots 224 are created, the CAS garbage collection process 232 traverses an object references (directory) table 234, which in one implementation is a search tree, to obtain information for the BLOBs. Note that the object references directory table tracks BLOB references, in which the key is a blob content address (CA), and the value is the set of content addresses of the CDFs that reference the blob.

In general, the CAS garbage collection process 232 looks for orphaned BLOBS (block 236), and deletes those deemed true orphans (block 238). More particularly, as the object reference table is traversed, for each BLOB, the CAS garbage collection process 232 checks if the BLOB is an orphan, that is, if there are no CDF references to that BLOB. If the BLOB is not an orphan, the CAS garbage collection process 232 skips further processing of the BLOB. If the BLOB is an orphan, the CAS garbage collection process 232 checks the BLOB age; if the BLOB is younger than the maximum duration of a C-Clip write transaction (two weeks in one implementation), the CAS garbage collection process 232 skips further processing of the BLOB.

However, if the BLOB being evaluated is two weeks old or older, the BLOB is considered to be a true orphan, and the CAS garbage collection process 232 deletes the BLOB. Note that this only makes the deleted BLOB a "candidate" for actual garbage collection, as this deletion does not reclaim the capacity of the BLOB, which may be done later if appropriate (that is, not restored) as described herein. Traversal continues to evaluate the next BLOB and so on until the traversal is finished.

After traversal of the object references table 234 is finished, the CAS garbage collection process 232 waits until background processing (block 240) of any CDFs that were written (by a foreground process, block 242) during object references table traversal, has completed. Significantly, the background process 240 can restore BLOBs (block 244) that were considered orphaned and deleted, but became referenced by a new CDF written during the object references table traversal, which causes a conflicting state. Once such background processing has completed, the CAS garbage collection process 232 deletes the snapshots 224 that it created at the beginning.

After both the object references table 234 has been traversed and the background processing (block 240) has completed, an ECS garbage collection engine 246 reclaims capacity (block 248) occupied by the BLOB objects that remain deleted. The result is an updated set of BLOB data 226(*b*), which can contain one or more orphaned BLOBs (block 250) that are less than the age of a maximum CDF transaction.

Figure 3:
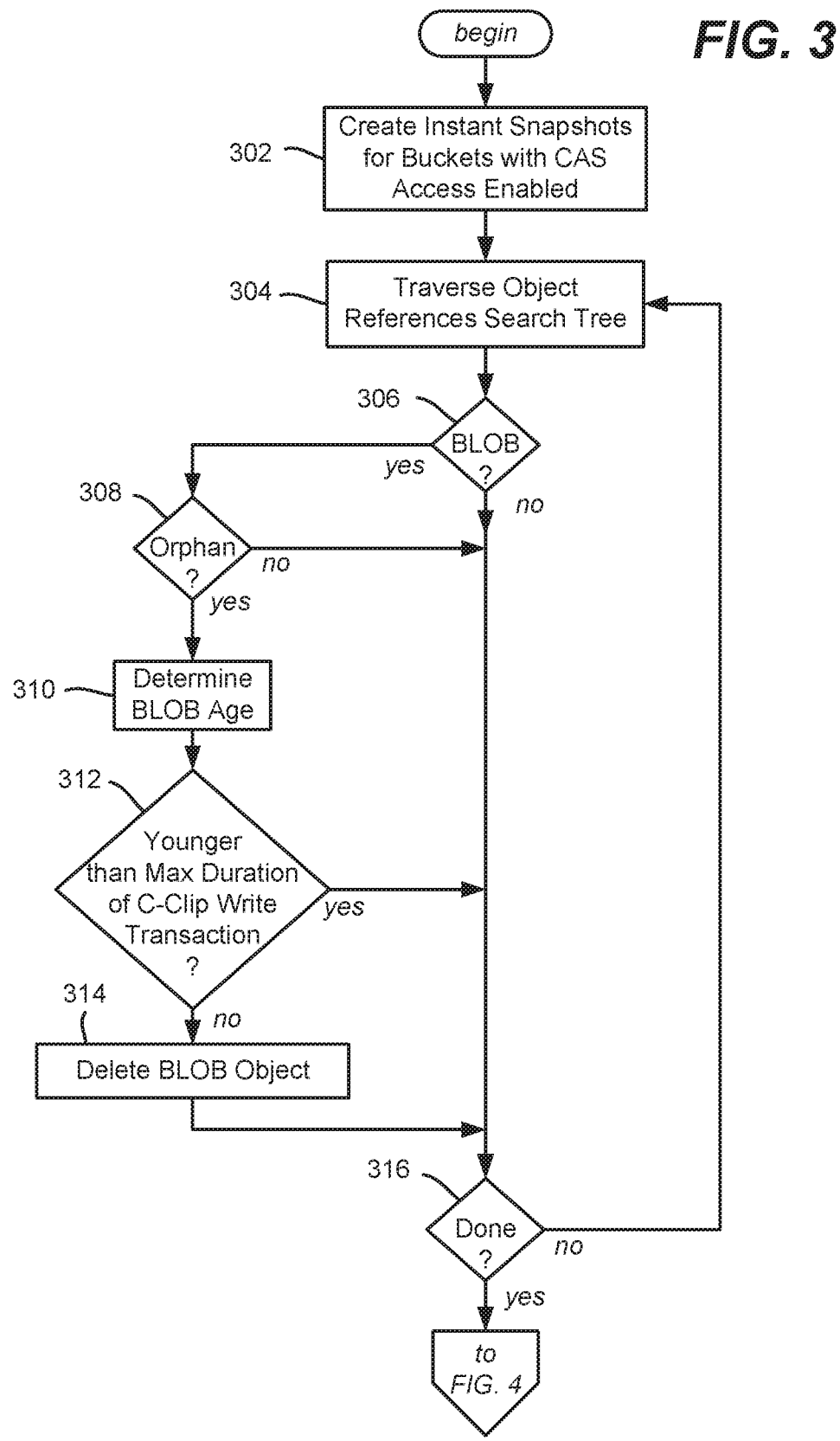
FIG. 3 is a flow diagram representing example operations related to determining orphaned data objects for deletion via garbage collection as candidates for having their capacity reclaimed, in accordance with various aspects and implementations of the subject disclosure.

FIG. 3 show the general example logic of the CAS garbage collection process 232, beginning at operation 302 where the bucket snapshots are created to facilitate the background (or delayed) processing of BLOB references in new CDFs as described herein.

Operation 304 represents the CAS garbage collection process 232 traversing the object references table to locate a BLOB reference. Via operation 306, for each BLOB found, at operation 308 the CAS garbage collection process 232 checks whether the BLOB is an orphan, that is, without CDF references to it. If the BLOB is not an orphan, operation 308 skips further processing of the BLOB by branching to operation 316, which continues the object references table traversal until done.

If instead at operation 308 the BLOB is an orphan, the CAS garbage collection process 232 determines the BLOB age, which is contained in object metadata for the BLOB. If at operation 312 the BLOB is younger than the (maximum duration of a CDF write transaction (e.g., two weeks), operation 312 skips further processing of the BLOB. Conversely, if at operation 312 the BLOB is at or is older than the maximum duration of a CDF write transaction, the CAS garbage collection process 232 considers the BLOB to be a true orphan, and at operation 314 deletes the BLOB. Traversal continues via operation 316 until the object references table is fully traversed.

Figure 4:
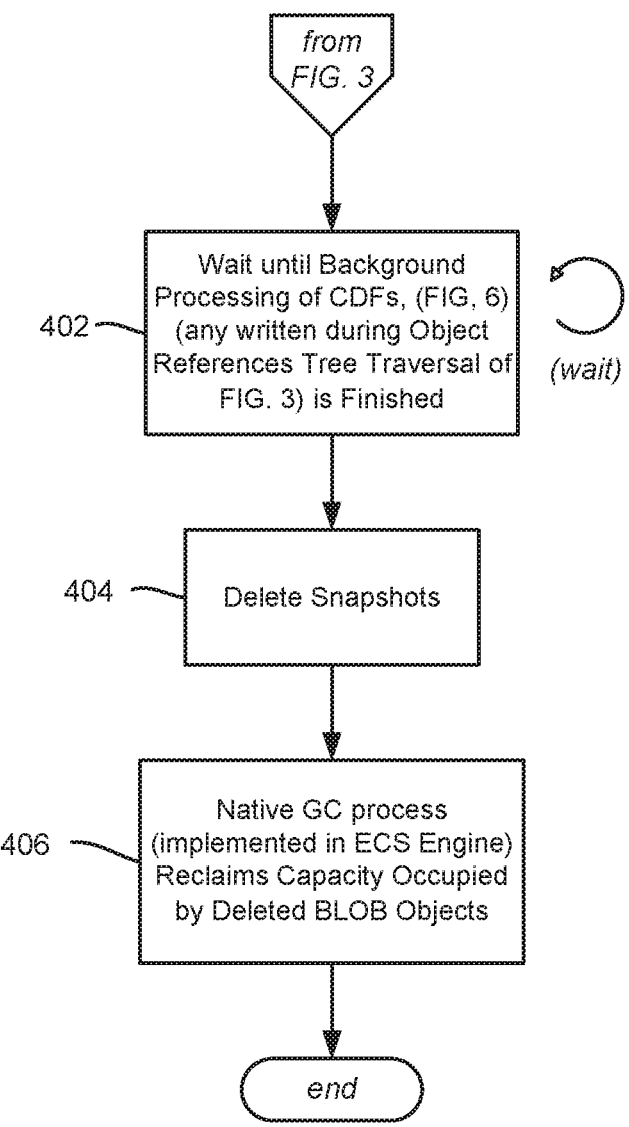
FIG. 4 is a flow diagram representing example operations related to waiting for deleted data objects to possibly be restored via a background process, and for reclaiming capacity of deleted data objects that have not been restored, in accordance with various aspects and implementations of the subject disclosure.

FIG. 4 shows waiting, after traversal of the object references table, at operation 402 until the background CDF processing (FIG. 6) completes, e.g., as signaled to the data storage system at the end of background CDF processing. When background processing, which handles CDFs that were written during object references traversal has completed, the CAS garbage collection process 232 deletes the previously created bucket snapshots (which may be used by the background CDF processing to restore deleted BLOBs as described herein).

At this time, any BLOBs that remain deleted are orphans that did not get referenced by a new CDF written during the object references table traversal. At operation 406, the native ESC garbage collection process (e.g., implemented in an ECS engine) reclaims capacity occupied by the deleted BLOB objects.

Figure 5:
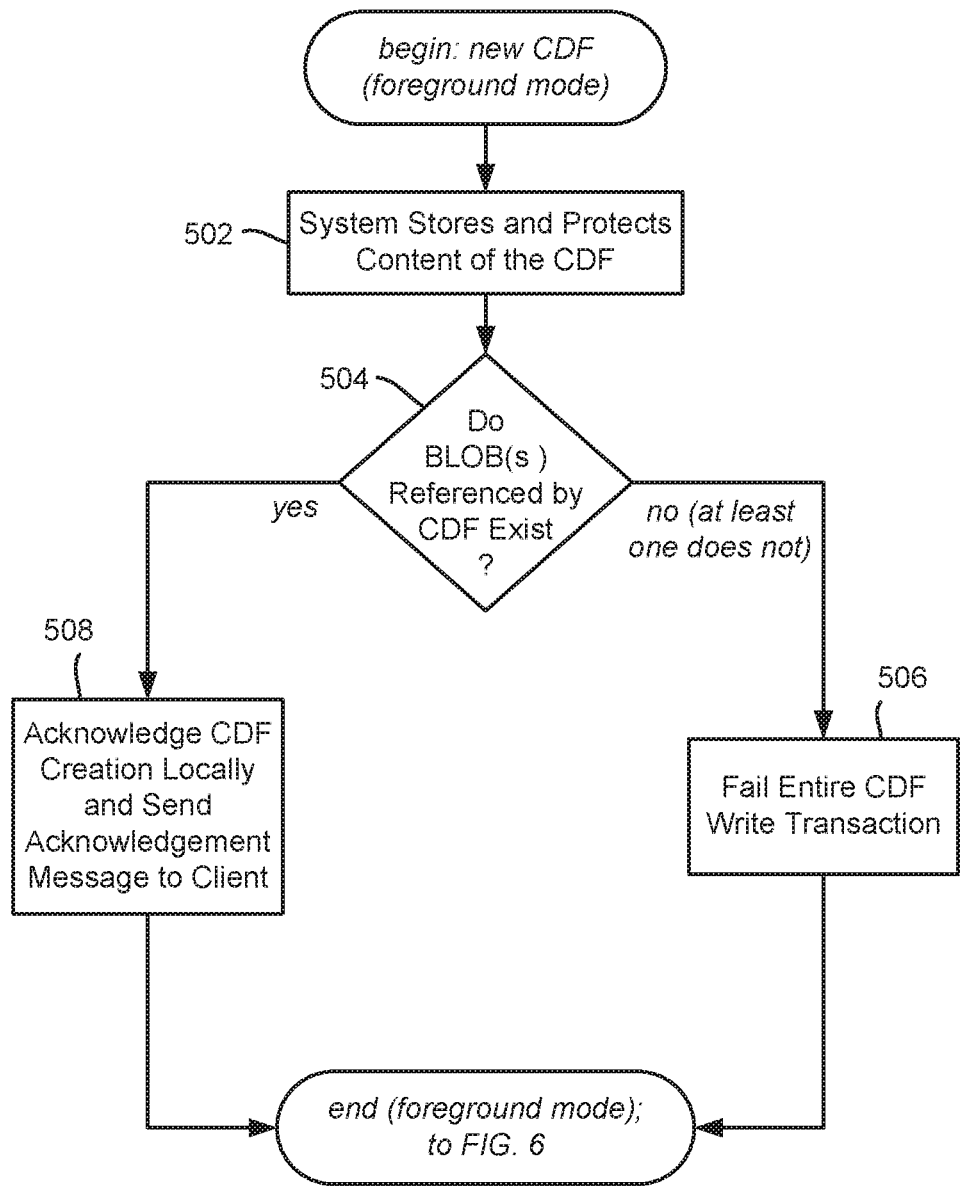
FIG. 5 is a flow diagram representing example operations related to handling a new descriptor file write via a foreground operation, in accordance with various aspects and implementations of the subject disclosure.

FIG. 5 summaries how the data storage system handles a new CDF, in a foreground mode/process, corresponding to the CDF write foreground processing 242 of FIG. 2. At operation 502 the system stores and protects the content of the CDF. At operation 504, the data storage system checks whether the BLOBs referenced by the CDF exist. If at least one BLOB referenced by the CDF does not exist, at operation 506 the data storage system stem fails the entire CDF write transaction. Conversely, if the BLOB(s) referenced by the CDF exist, the data storage system acknowledges the CDF creation locally, and sends an acknowledgement message to the client, as represented by operation 508. The foreground mode then ends.

It should be noted that operation 504 of the foreground mode above that checks for a BLOB's existence is not part of the logic of the CAS garbage collection process, but rather follows from the general CENTERA CAS implementation. Further note that the check for a BLOB's existence is a very fast operation relative to a system metadata update operation.

Figure 6:
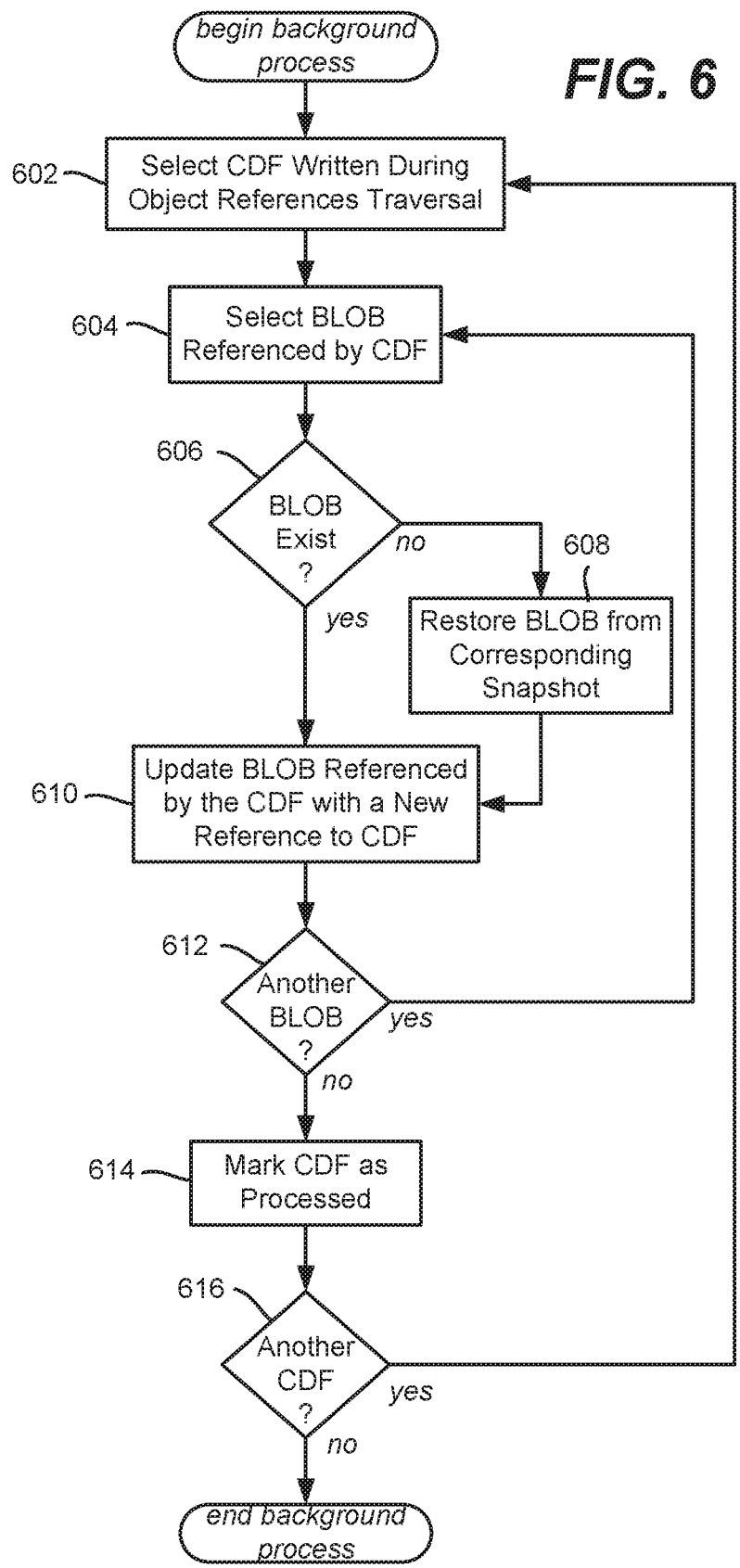
FIG. 6 is a flow diagram representing example operations related to handling a new descriptor file write via a background operation, including to restore a deleted data object that is referenced by a new descriptor file written in the foreground operations of FIG. 5, in accordance with various aspects and implementations of the subject disclosure.

FIG. 6 summaries how the data storage system handles one or more new CDFs, in a background mode/process corresponding to the CDF write background P=processing 240 of FIG. 2. In general, the data storage system tries to update each BLOB referenced by the CDF with a new reference to the BLOB.

At operation 602, the data storage system selects a new CDF (written in the foreground mode during the object references traversal), and selects a BLOB referenced by that CDF at operation 604. If the CDF-referenced BLOB does not exist, at operation 608 the BLOB restored from the corresponding snapshot. The referenced BLOB also gets updated with a new reference to the CDF at operation 610. Note that this may happen only while the CAS garbage collection process is active; the expected probability of this event is very low. The operations continue with the next referenced BLOB and so on via operation 612 until no BLOBs referenced by the CDF remain; when this occurs, the CDF is marked as processed at operation 614.

If another CDF has not yet been handled in the background mode, operation 616 repeats the process until no CDFs remain to be processed. When none remain, the background mode ends. At this time, the data storage system knows whether the object references table traversal has completed, and if so, ends the wait at operation 402 of FIG. 4 to begin reclaiming capacity as described herein. Otherwise it is possible that at least one new CDF may be written during further traversal of the object references table, in which event the operations of FIGS. 4 and 5 will be performed for the at least one new CDF.

Figure 7:
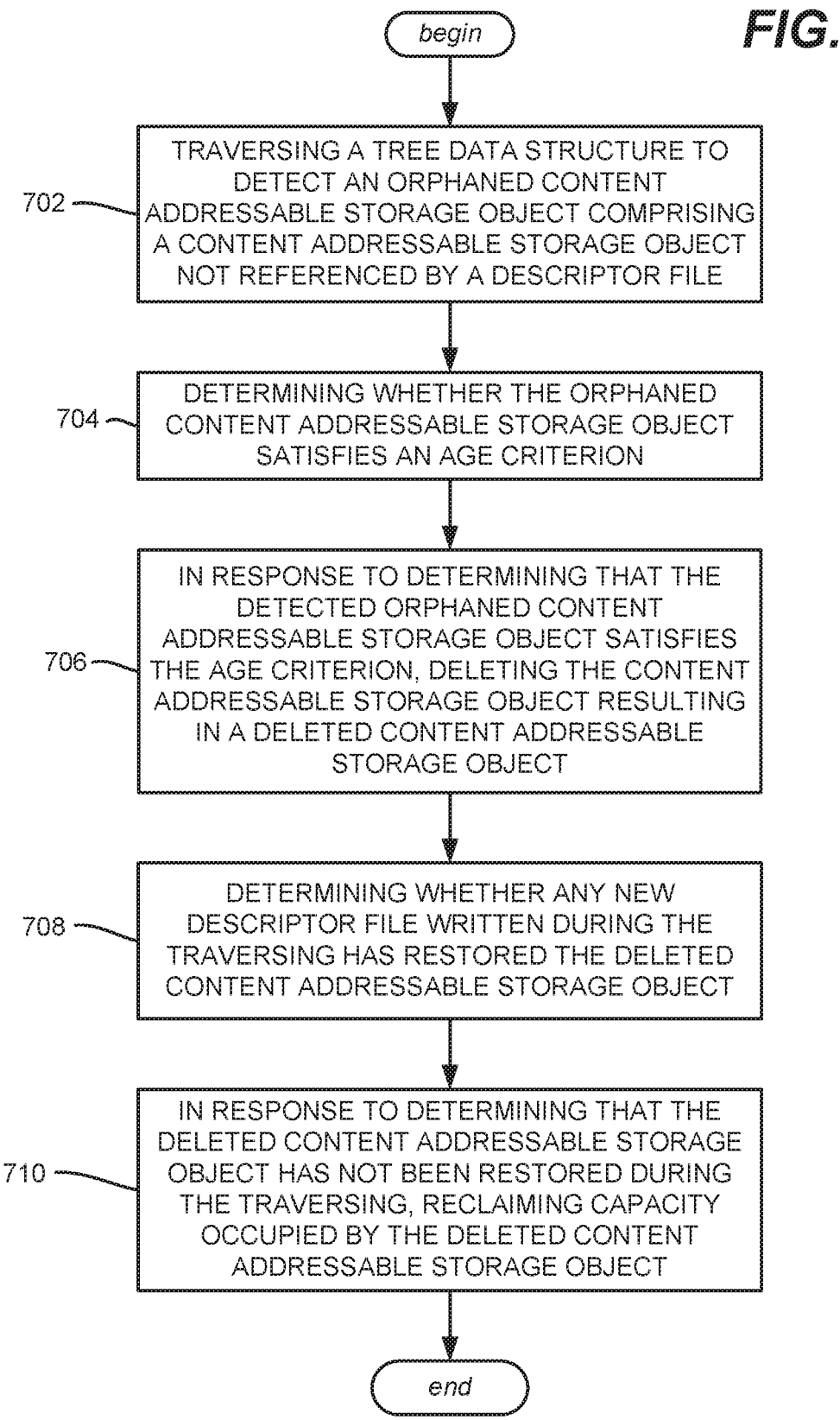
FIG. 7 is a flow diagram showing example operations related to detecting data objects for garbage collection if not restored, in accordance with various aspects and implementations of the subject disclosure.

One or more aspects are represented in FIG. 7, such as of a system comprising a processor, and a memory that stores executable instructions that, when executed by the processor, facilitate performance of operations. Operation 702 represents traversing a tree data structure to detect an orphaned content addressable storage object comprising a content addressable storage object not referenced by a descriptor file. Operation 704 represents determining whether the orphaned content addressable storage object satisfies an age criterion. Operation 706 represents, in response to determining that the detected orphaned content addressable storage object satisfies the age criterion, deleting the content addressable storage object resulting in a deleted content addressable storage object. Operation 708 represents determining whether any new descriptor file written during the traversing has restored the deleted content addressable storage object. Operation 710 represents, in response to determining that the deleted content addressable storage object has not been restored during the traversing, reclaiming capacity occupied by the deleted content addressable storage object.

Further operations can comprise creating a snapshot of a bucket containing the content addressable storage object. Further operations can comprise deleting the snapshot after determining whether the any new descriptor file written during the traversing has restored the deleted content addressable storage object. The orphaned content addressable storage object can be a first orphaned content addressable storage object, and further operations can comprise creating a new descriptor file, determining that a second orphaned content addressable storage object referenced by the new descriptor file does not exist, and restoring the second orphaned content addressable storage object from the snapshot.

The age criterion can be based on a maximum duration of a descriptor file write transaction. The maximum duration can be two weeks.

Deleting the content addressable storage object can be performed by a first garbage collection process, and reclaiming the capacity occupied by the deleted content addressable storage object can be performed by a second garbage collection engine.

The detected content addressable storage object can be a binary large object. The descriptor file can be a C-Clip descriptor file.

Figure 8:
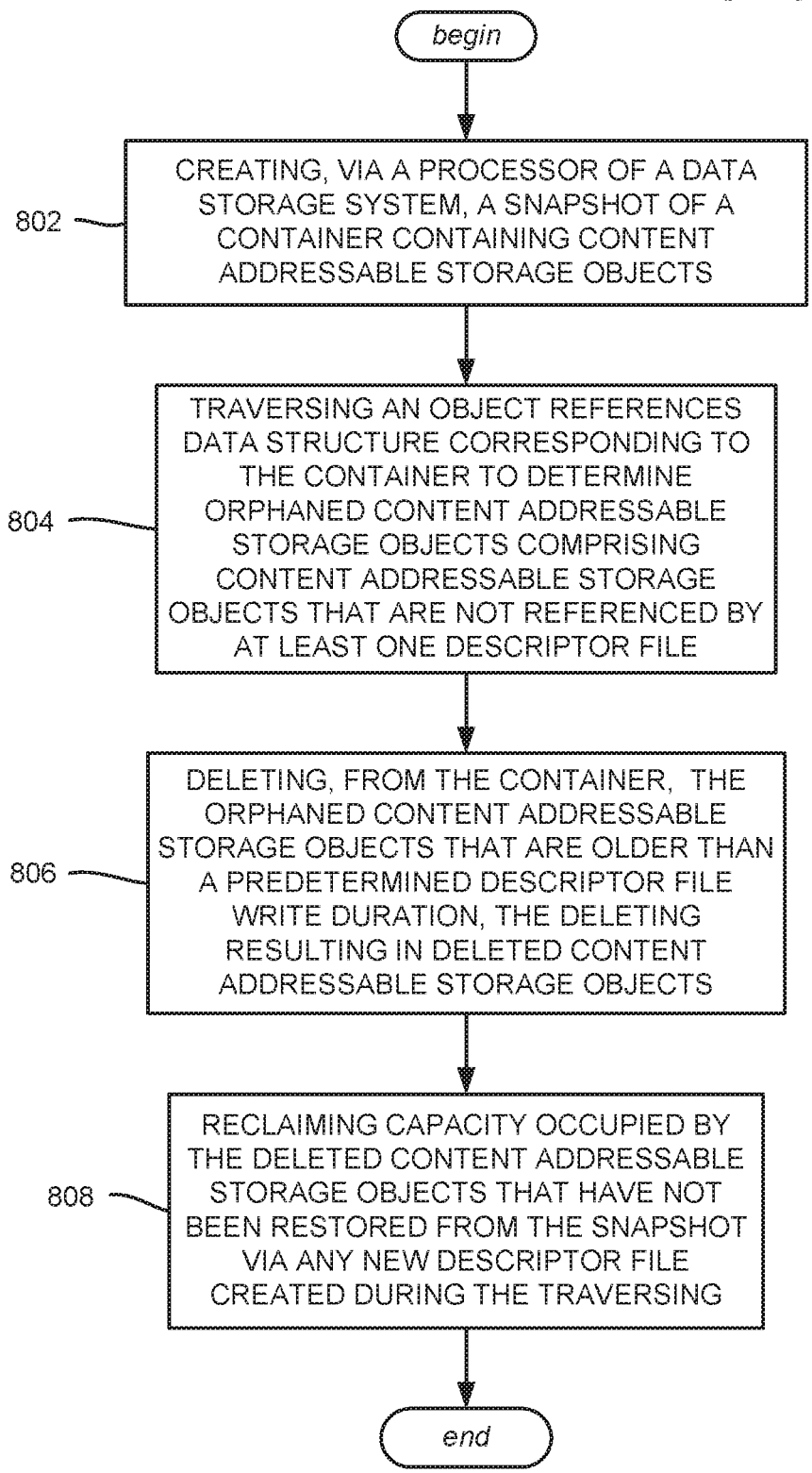
FIG. 8 is a flow diagram showing example operations related to using snapshot data as needed to restore data objects, and reclaiming capacity via garbage collection of data objects not restored in accordance with various aspects and implementations of the subject disclosure.

One or more aspects are represented in FIG. 8, such as example operations of a method. Operation 802 represents creating, via a processor of a data storage system, a snapshot of a container containing content addressable storage objects. Operation 804 represents traversing an object references data structure corresponding to the container to determine orphaned content addressable storage objects comprising content addressable storage objects that are not referenced by at least one descriptor file. Operation 806 represents deleting, from the container, the orphaned content addressable storage objects that are older than a predetermined descriptor file write duration, the deleting resulting in deleted content addressable storage objects. Operation 808 represents reclaiming capacity occupied by the deleted content addressable storage objects that have not been restored from the snapshot via any new descriptor file created during the traversing.

Traversing the object references data structure can comprise running a first garbage collection operation, and wherein the reclaiming the capacity comprises running a second garbage collection operation.

Aspects can comprise writing a new descriptor file, during the traversing and before the reclaiming the capacity, that references a deleted content addressable storage object, and restoring the content addressable storage object from the snapshot to an undeleted state.

Writing the new descriptor file can comprise running a foreground process, and restoring the content addressable storage object from the snapshot to the undeleted state can comprise running a background process. Reclaiming the capacity can be performed after the background process completes.

Traversing the object references data structure can comprise traversing a search tree.

Creating the snapshot of the container can comprise creating a first snapshot of a first container, and aspects can comprise creating respective one or more snapshots of one or more respective containers.

Figure 9:
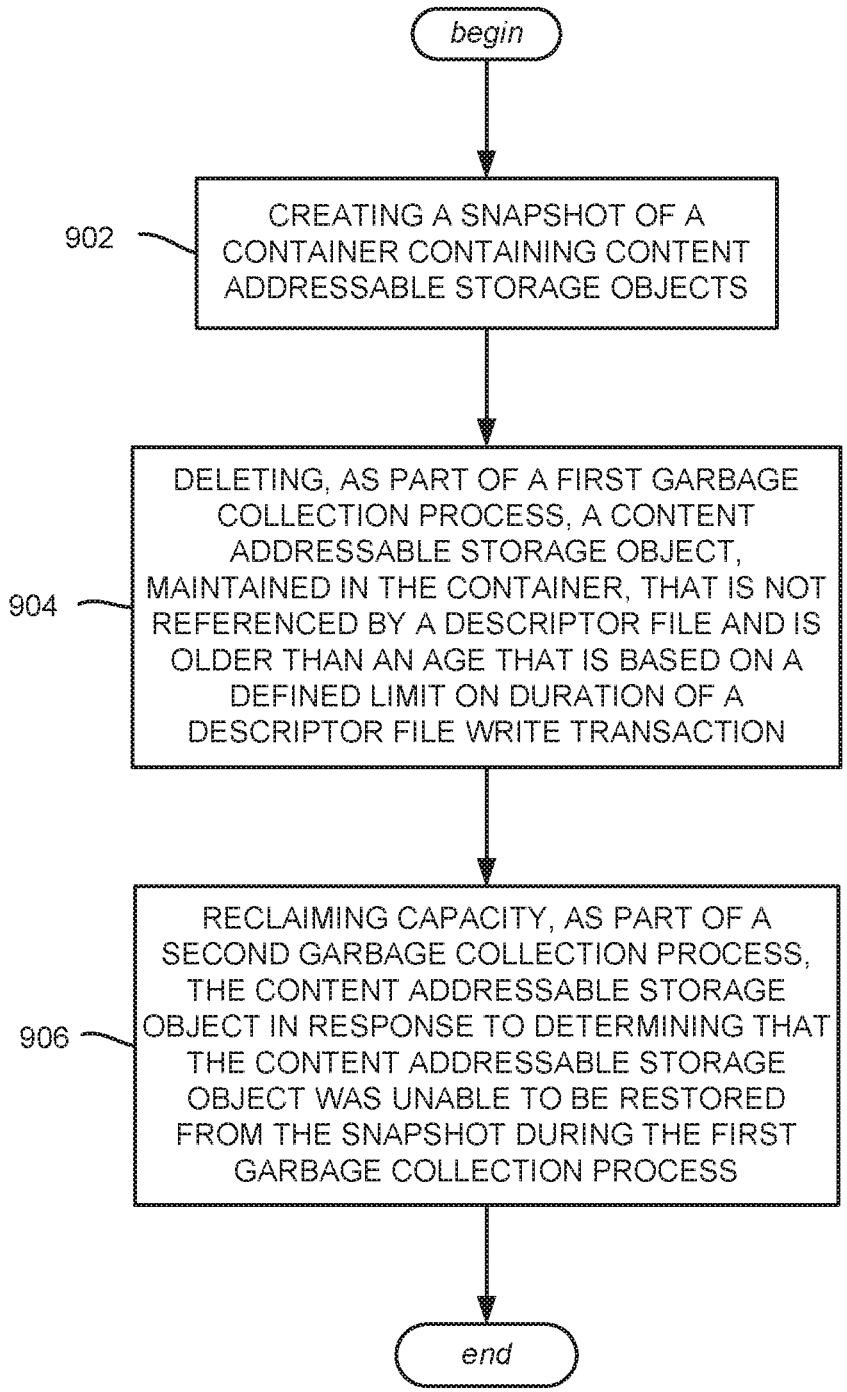
FIG. 9 is a flow diagram showing example operations related to creating snapshot data, deleting non-referenced and older objects in a first garbage collection process, and reclaiming capacity via a second garbage collection process those data objects that are deleted and not restored via the snapshot data, in accordance with various aspects and implementations of the subject disclosure.

One or more aspects, such as implemented in a machine-readable storage medium, can comprise executable instructions that, when executed by a processor of a data storage system, can be directed towards operations exemplified in FIG. 9. Example operation 902 represents creating a snapshot of a container containing content addressable storage objects. Example operation 904 represents deleting, as part of a first garbage collection process, a content addressable storage object, maintained in the container, which is not referenced by a descriptor file and is older than an age that is based on a defined limit on duration of a descriptor file write transaction. Example operation 906 represents reclaiming capacity, as part of a second garbage collection process, the content addressable storage object in response to determining that the content addressable storage object was unable to be restored from the snapshot during the first garbage collection process.

The content addressable storage object can be a first content addressable storage object, and further operations can comprise, deleting, as part of the first garbage collection process, a second content addressable storage object, maintained in the container, that is not referenced by any descriptor file and is older than the age that is based on the defined limit on the duration of a descriptor file write transaction, writing a new descriptor file with a reference to the second content addressable storage object, restoring the second content addressable storage object from the snapshot, and avoiding reclamation of capacity of the second content addressable storage object during the second garbage collection process.

Writing the new descriptor file can comprise running a foreground process, restoring the second content addressable storage object from the snapshot can comprise running a background process that starts after the foreground process completes, and the reclaiming the capacity in the second garbage collection process can start after the background process completes.

The operations can comprise traversing an object references data structure as part of the first garbage collection process.

As can be seen, described herein is a technology that facilitates performing garbage collection without halting data writes and without a data loss event. The technology uses snapshots (or other preserved data) to restore data in a background mode when a possible conflict is detected. The system is practical to implement.

Figure 10:
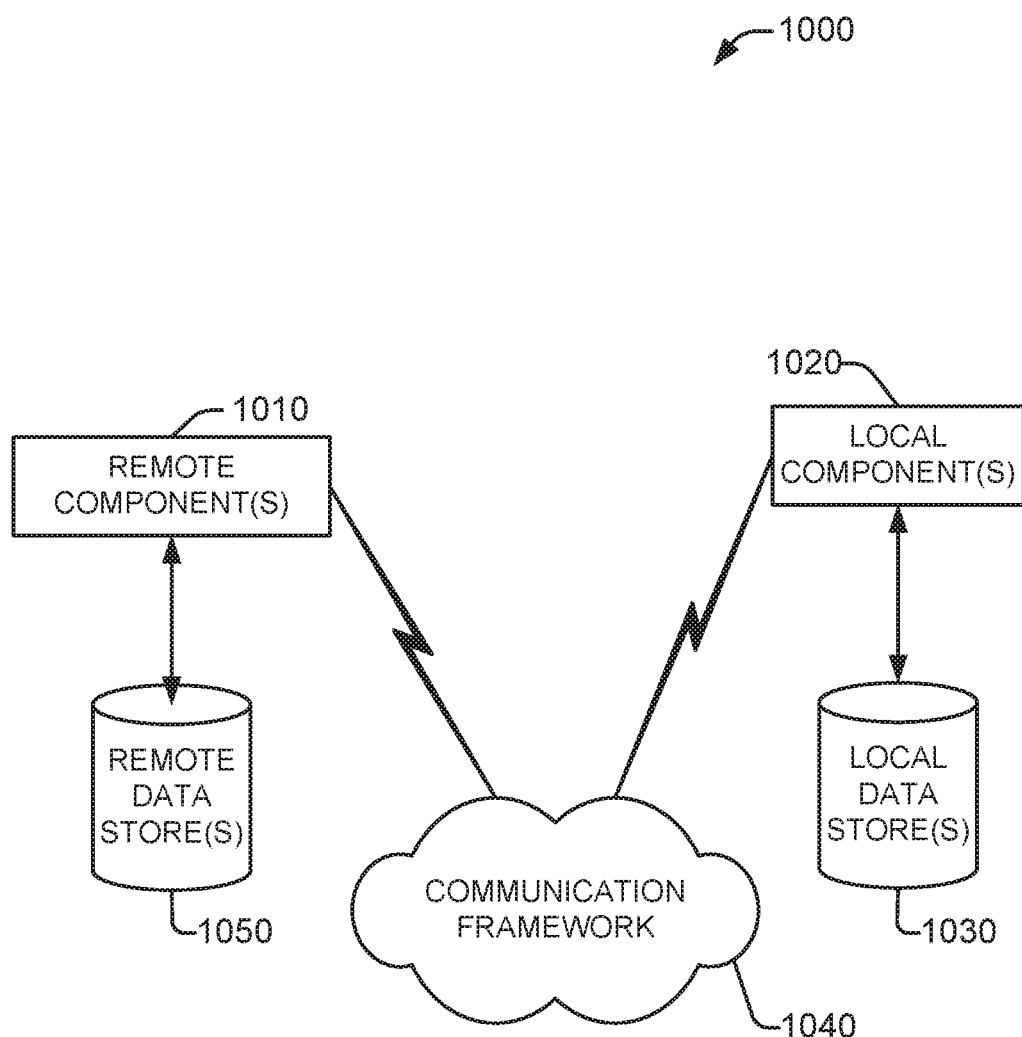
FIG. 10 depicts an example schematic block diagram of a computing environment with which the disclosed subject matter can interact, in accordance with various aspects and implementations of the subject disclosure.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
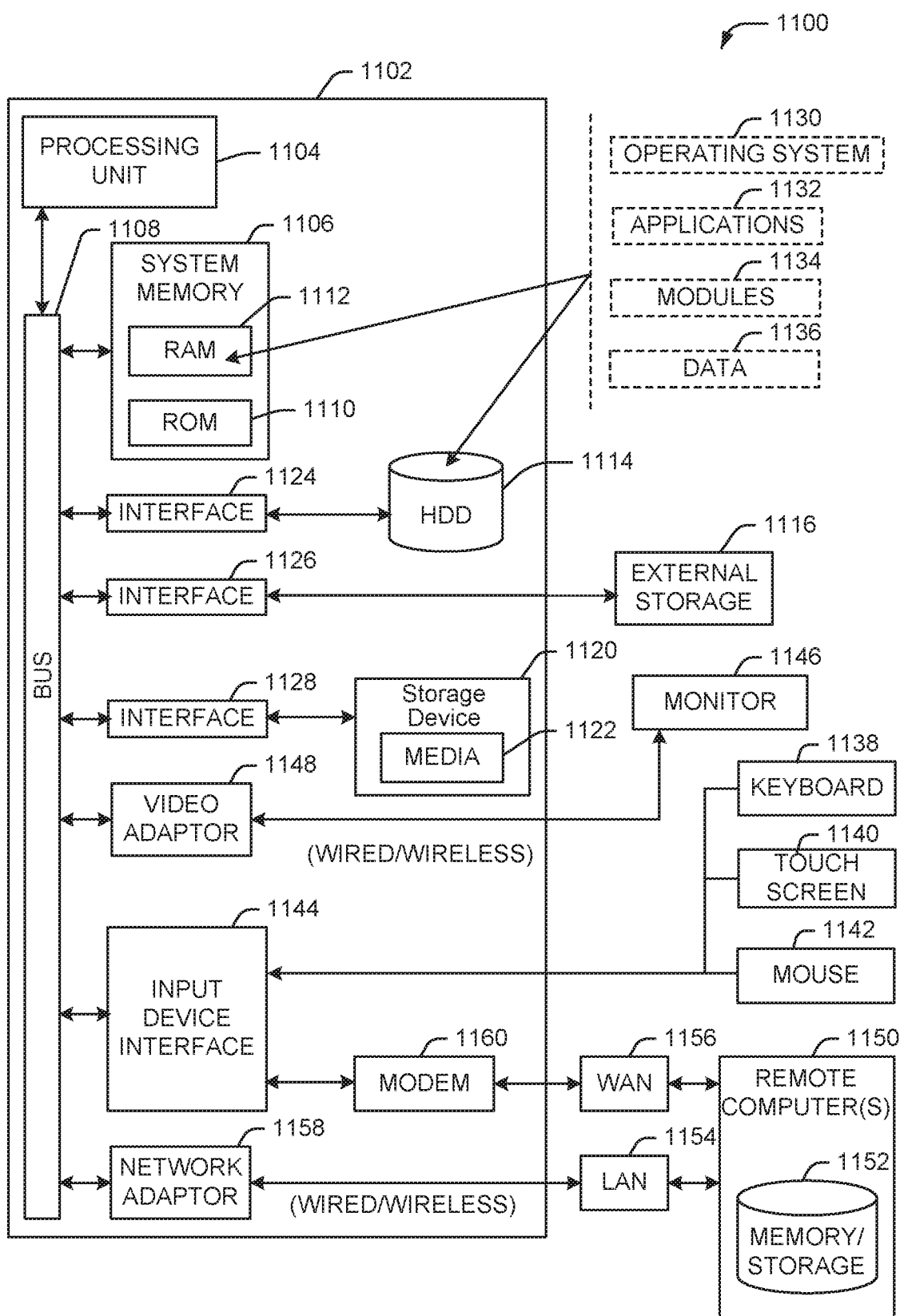
FIG. 11 illustrates an example block diagram of a computing system operable to execute the disclosed systems and methods in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
   a processor; and
   a memory that stores executable instructions that, when executed by the processor, facilitate performance of operations, the operations comprising:
      traversing a tree data structure to detect an orphaned content addressable storage object comprising a content addressable storage object not referenced by a descriptor file;
      determining whether the orphaned content addressable storage object satisfies an age criterion;
      in response to determining that the detected orphaned content addressable storage object satisfies the age criterion, deleting the content addressable storage object resulting in a deleted content addressable storage object;
      creating a snapshot of a bucket containing the content addressable storage object;
      determining whether any new descriptor file written during the traversing has restored the deleted content addressable storage object and deleting the snapshot thereafter; and
      in response to determining that the deleted content addressable storage object has not been restored during the traversing, reclaiming capacity occupied by the deleted content addressable storage object.

2. The system of claim 1, wherein the orphaned content addressable storage object is a first orphaned content addressable storage object, and wherein the operations further comprise creating a new descriptor file, determining that a second orphaned content addressable storage object referenced by the new descriptor file does not exist, and restoring the second orphaned content addressable storage object from the snapshot.

3. The system of claim 1, wherein the age criterion is based on a maximum duration of a descriptor file write transaction.

4. The system of claim 3, wherein the maximum duration is two weeks.

5. The system of claim 1, wherein the deleting the content addressable storage object is performed by a first garbage collection process, and wherein the reclaiming the capacity occupied by the deleted content addressable storage object is performed by a second garbage collection engine.

6. The system of claim 1, wherein the detected content addressable storage object is a binary large object.

7. The system of claim 1, wherein the descriptor file is a C-Clip descriptor file.

8. A method, comprising:
   creating, via a processor of a data storage system, a snapshot of a container containing content addressable storage objects;
   traversing an object references data structure corresponding to the container to determine orphaned content addressable storage objects comprising content addressable storage objects that are not referenced by at least one descriptor file;
   deleting, from the container, the orphaned content addressable storage objects that are older than a predetermined descriptor file write duration, the deleting resulting in deleted content addressable storage objects; and
   reclaiming capacity occupied by the deleted content addressable storage objects that have not been restored from the snapshot via any new descriptor file created during the traversing.

9. The method of claim 8, wherein the traversing the object references data structure comprises running a first garbage collection operation, and wherein the reclaiming the capacity comprises running a second garbage collection operation.

10. The method of claim 8, further comprising writing a new descriptor file, during the traversing and before the reclaiming the capacity, that references a deleted content addressable storage object, and restoring the content addressable storage object from the snapshot to an undeleted state.

11. The method of claim 10, wherein the writing the new descriptor file comprises running a foreground process, and wherein the restoring the content addressable storage object from the snapshot to the undeleted state comprises running a background process.

12. The method of claim 11, wherein the reclaiming the capacity is performed after the background process completes.

13. The method of claim 8, wherein the traversing the object references data structure comprises traversing a search tree.

14. The method of claim 8, wherein the creating the snapshot of the container comprises creating a first snapshot of a first container, and further comprising creating respective one or more snapshots of one or more respective containers.

15. The method of claim 8, wherein the deleting the orphaned content addressable storage objects employs the predetermined descriptor file write duration that is based on a maximum duration of a descriptor file write transaction.

16. A non-transitory machine-readable medium, comprising executable instructions that, when executed by a processor of a data storage system, facilitate performance of operations, the operations comprising:
- creating a snapshot of a container containing content addressable storage objects;
- deleting, as part of a first garbage collection process, a content addressable storage object, maintained in the container, that is not referenced by a descriptor file and is older than an age that is based on a defined limit on duration of a descriptor file write transaction; and
- reclaiming capacity, as part of a second garbage collection process, the content addressable storage object in response to determining that the content addressable storage object was unable to be restored from the snapshot during the first garbage collection process.

17. The non-transitory machine-readable medium of claim 16, wherein the content addressable storage object is a first content addressable storage object, and wherein the operations further comprise, deleting, as part of the first garbage collection process, a second content addressable storage object, maintained in the container, that is not referenced by any descriptor file and is older than the age that is based on the defined limit on the duration of a descriptor file write transaction, writing a new descriptor file with a reference to the second content addressable storage object, restoring the second content addressable storage object from the snapshot, and avoiding reclamation of capacity of the second content addressable storage object during the second garbage collection process.

18. The non-transitory machine-readable medium of claim 17, wherein the writing the new descriptor file comprises running a foreground process, wherein the restoring the second content addressable storage object from the snapshot comprises running a background process that starts after the foreground process completes, and wherein the reclaiming the capacity in the second garbage collection process starts after the background process completes.

19. The non-transitory machine-readable medium of claim 16, wherein the operations comprise traversing an object references data structure as part of the first garbage collection process.

20. The method of claim 15, wherein the maximum duration is two weeks.

* * * * *